US005631917A

United States Patent [19]

Ogawa et al.

[11] Patent Number: 5,631,917
[45] Date of Patent: May 20, 1997

[54] LASER APPARATUS

[75] Inventors: Makoto Ogawa; Yasushi Matsuda, both of Chiba-ken, Japan

[73] Assignee: Miyachi Technos Corporation, Noda, Japan

[21] Appl. No.: 604,831

[22] Filed: Feb. 22, 1996

[30] Foreign Application Priority Data

Feb. 23, 1995 [JP] Japan ................................. 7-059884

[51] Int. Cl.$^6$ ....................................................... H01S 3/04
[52] U.S. Cl. ................................ 372/35; 372/34; 372/33; 372/38
[58] Field of Search ............................... 372/38, 34, 35, 372/33

[56] References Cited

U.S. PATENT DOCUMENTS

4,507,789  3/1985  Daly et al. .................................. 372/35

Primary Examiner—Leon Scott, Jr.
Attorney, Agent, or Firm—Wenderoth, Lind & Ponack

[57] ABSTRACT

To adapt temperature control of a secondary cooling water to the temperature of a primary cooling water: A control apparatus computes duty factor D from measured open time period $T_{ON}$ and closed time period $T_{OFF}$ of a solenoid valve (step B3) for each cycle of the solenoid valve operation (step B2). The apparatus classifies the computed duty factor into one of a plurality of predetermined ranges and conditionally updates the reference temperature Pt of the secondary cooling water based on the classification (B5, B6, B7). If the reference temperature has reached an upper limit $P_{MAX}$ and if the duty factor has exceeded an upper limit, e.g., 95 percent (B8), the apparatus stops the operation of a laser oscillator and provides an alarm.

5 Claims, 5 Drawing Sheets

LASER APPARATUS

FIELD

The present invention relates to water-cooled laser apparatus.

PRIOR ART

A solid-state laser apparatus such as YAG(Yttrium-Aluminum-Garnet), laser apparatus employs a cooling system which cools a laser rod and an excitation lamp within a laser oscillator by means of cooled deionized water for the purpose of stabilizing the laser oscillation. Typically, a pump draws the deionized water from a tank to supply it to the laser oscillator. The deionized water from the laser oscillator is cooled by a heat exchanger and then returned to the tank. The heat exchanger is of a water-cooled type (water-to-water heat exchanger) which provides heat exchange between the primary cooling water (commercial or industrial water) and the secondary cooling water (deionized water).

To control the temperature of the secondary cooling water (deionized water), the prior art employs a temperature sensor attached to the tank and a solenoid valve disposed in the piping for supplying the primary cooling water. The solenoid valve is on-off-controlled so as to maintain the temperature of the secondary cooling water near the preselected temperature.

In accordance with the prior art temperature control, when the temperature of the secondary cooling water (detected by the temperature sensor) exceeds the preselected temperature, the solenoid valve is opened to allow the primary cooling water to flow into the heat exchanger. Thus, the heat exchange re-starts or advanced to decrease the temperature of the secondary cooling water. On the other hand, when the temperature of the secondary cooling water falls below the preselected temperature, the solenoid valve is closed to prevent the primary cooling water supply to the heat exchanger. Without new supply of the primary cooling water, the secondary cooling water in the heat exchanger will undergo reduced heat exchange. In this manner, the solenoid valve is on-off-controlled depending on the temperature of the secondary cooling water relative to the preselected temperature. This controls the heat exchanger with respect to the heat exchange rate to maintain the temperature of the secondary cooling water near the preselected temperature.

In the prior art temperature control, the primary cooling water (typically commercial or industrial water) is not temperature-controlled and thus subject to temperature variations, haying a considerable difference in temperature between winter and summer. Nevertheless, in the prior art water-cooled laser apparatus, the preselected temperature of the secondary cooling water is fixed. Thus, depending on the temperature of the primary cooling water, the duty factor of the solenoid valve varies. Running at an abnormally high or low duty factor of the solenoid valve may lead to malfunction of the temperature control and/or failure of the solenoid valve. As a result, it is difficult to provide stable operation of the laser oscillation.

Particularly, in summer, the temperature of the primary cooling water can be high enough to hold the solenoid valve at the open position so that the temperature control fails to function. To avoid this, a cooling apparatus chiller cooler) for cooling the primary cooling water is eventually required. In winter, the temperature of the primary cooling water is considerably low. Thus, it takes a very long time for the temperature of the secondary cooling water to reach the preselected temperature. Once the temperature of the secondary cooling water has been reached, the solenoid valve must frequently be switched between the open and closed positions due to the greater cooling effect by the primary cooling water.

SUMMARY OF THE INVENTION

It is, therefore, an object of the invention to provide a water-cooled laser apparatus which adaptively controls the temperature of the secondary cooling water depending on the temperature of the primary cooling water to thereby maintain the stable laser oscillation.

To achieve the object, a laser apparatus of the invention including means for control ling the temperature of the secondary cooling water at a desired temperature by a water-cooled heat exchanger providing heat exchange between primary and secondary cooling water, and for supplying the temperature-controlled secondary cooling water to a laser oscillator comprises temperature detecting means for detecting the temperature of the secondary cooling water, a solenoid valve disposed in a piping which supplies the primary cooling water, temperature control means for comparing a signal from the temperature detecting means indicative of the temperature of the secondary cooling water with a reference value and for selectively opening or closing the solenoid valve depending on the result of the comparing, duty factor computing means for computing duty factor of open and closed times of the solenoid valve, and reference control means for variably controlling the reference value based on the computed duty factor.

With this arrangement, when the temperature of the primary cooling water changes, the change will be reflected in the duty factor of the solenoid valve. The reference control means responds to the change of the duty factor. For example, the reference control means increments the reference value when the duty factor exceeds preselected appropriate range. The changed (incremented) reference value acts on the comparing by the temperature control means to provide a negative feedback to the open and closed times of the solenoid valve so that the duty factor will return within the appropriate range.

BRIEF DESCRIPTION OF THE DRAWINGS

The above and other objects, features and advantages of the invention will become more apparent from the following description taken in conjunction with the drawings in which.

DETAILED DESCRIPTION OF THE PREFERRED EMBODIMENTS

Figure 1:
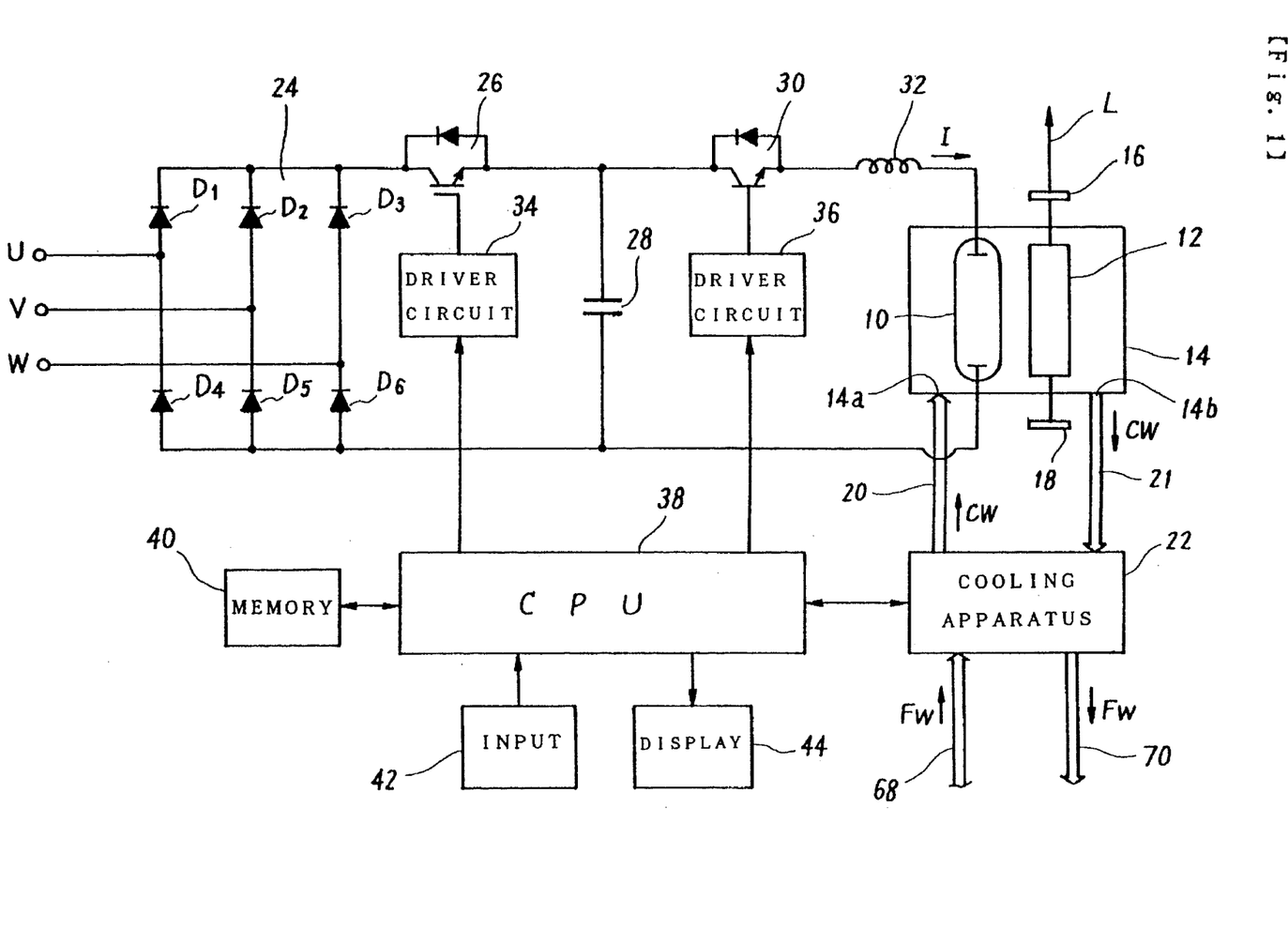
FIG. 1 is a block diagram of an YAG laser beam machining apparatus in accordance with the invention.

FIG. 1 shows an YAG laser beam machining apparatus in accordance with the invention.

In the YAG laser beam machining apparatus, an excitation lamp 10 and an YAG rod (laser medium) 12 of a laser oscillator are disposed within a light reflecting tube (not shown) within a chamber 14 of acrylic resin. A pair of optical resonator mirrors 16 and 18 are disposed outside of the chamber 14 in the optical axis of the YAG rod 12 and face each other through the rod 12.

The excitation lamp 10 emits light in pulses in response to lamp current I supplied from a laser electric power supply (to be described). The light energy from the lamp 10 excites the YAG rod 19. to emit light from its opposite faces. The light from the rod 12 repeats reflections between the optical resonator mirrors 18 and 18 and is thus amplified. The amplified light (pulsed laser beam) L outputs from an output mirror 18. The pulsed laser beam L from the output mirror enters an optical fiber (not shown) through a laser beam input unit (not shown). After passing through the optical fiber, the pulsed laser beam L is received by a focusing unit (not shown) which directs the pulsed laser beam L to a point of a workpiece to be processed.

The chamber 14 is connected to a water-cooled cooling apparatus 22 through pipings 20 and 21. The temperature-control led secondary cooling water (e.g., deionized water) CW from the cooling apparatus 29 passes through the piping 20 to an inlet 14a of the chamber 14. In the chamber 14, the deionized water CW flows through a waterway surrounding the excitation lamp 10 and the YAG rod 12. From an outlet 14b of the chamber 14, the deionized water CW is fed back to the cooling apparatus 22 through the piping 21. In this manner, the temperature-controlled deionized water CW is supplied to the excitation lamp 10 and the YAG rod 12 in the laser oscillator to stabilize the laser oscillation.

In the laser power supply, three-phase input terminals u, v and w receive a three-phase AC commercial electric power. A three-phase full-wave rectifier 24 including six diodes D1–D8 converts the three phase AC electric power to a DC electric power. The DC electric power is supplied to a capacitor bank 28 through a charge controlling insulated gate bipolar transistor (IGBT) 28. One end of the capacitor bank 28 is connected to one end of the excitation lamp 10 through a discharge controlling giant transistor (GTR) 30 and a current smoothing coil 32. The other end of the capacitor bank 28 is connected to the other end of the excitation lamp 10. When GTR 30 turns on, the electric energy stored in the capacitor bank 28 is supplied to the excitation lamp 10 through the GTR 30 and the coil 32.

The switching of the charge control ling IGBT 26 and the discharge controlling GTR 30 is controlled by CPU (microprocessor) 38 through driver circuits 34 and 36, respectively.

CPU 38 controls the entirety of the YAG laser beam processing apparatus. CPU 38 is connected to the cooling apparatus 22, a memory 40, an input device 42, a display device 44, etc. The memory 40 stores programs according to which CPU 38 operates, input data and computed data. The input device 42 may comprise a keyboard and is used to input data. The display device 44 displays input data from the input device 42, alarm and messages from CPU 38.

Figure 2:
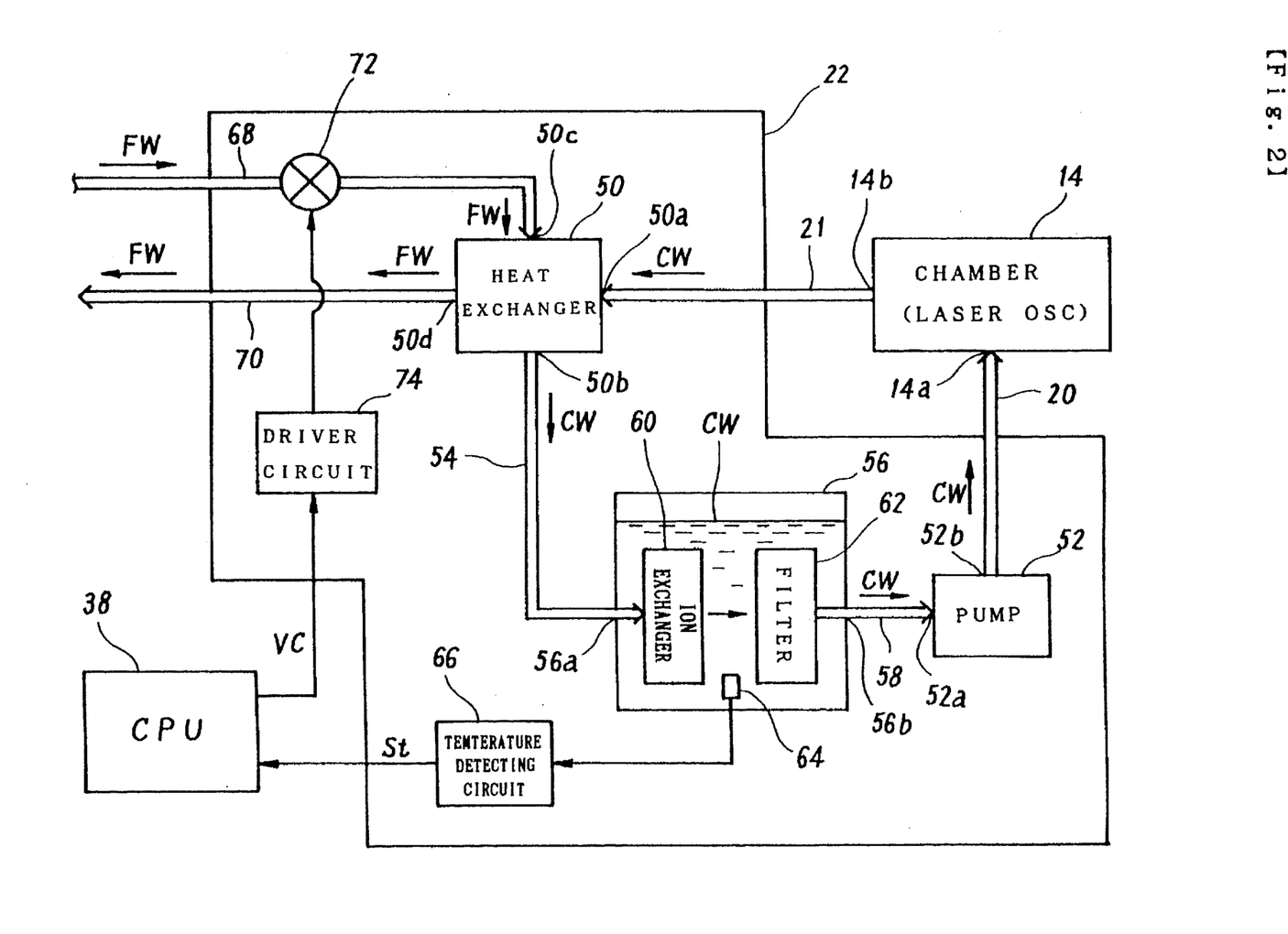
FIG. 2 is a block diagram of one embodiment of a cooling apparatus in accordance with the invention.

FIG. 2 shows the cooling apparatus 22 in more detail.

The outlet 14b of the chamber 14 is connected to a secondary inlet 50a of a water-cooled heat exchanger (water-to-water heat exchanger) 50 through a piping 21. The inlet 14a of the chamber 14 is connected to an outlet 52b of a pump 52 through a piping 20.

A secondary outlet 50b of the heat exchanger 50 is connected to an inlet 56a of a tank 56 through a piping 54. An outlet 56b of the tank 56 is connected to an inlet 52a of the pump 52 through a piping 58.

The tank 56 stores the secondary cooling water (deionized water) CW. Within the tank 56, an ion exchanger 60 and a filter 62 are disposed underwater. An inlet of the ion exchanger 60 is connected to the inlet 56a of the tank 56. An outlet of the filter 62 is connected to the outlet 56b of the tank 56.

A temperature sensor 64 is disposed within the tank 56 to detect the temperature of the deionized water CW. The temperature sensor 64 is connected to a temperature detecting circuit 66 which outputs an analog temperature signal St indicative of the temperature of the deionized water CW. An analog-to-digital converter (not shown) converts the analog temperature signal St from the temperature detector 66 to a digital signal which is then supplied to CPU 38.

Primary ports of the heat exchanger 50 are connected through pipings 68 and 70 to a water supply (not shown) of the primary cooling water FW (e.g., commercial or industrial water) which will be referred to as commercial water FW hereinunder. The commercial water FW from the water supply flows through the piping 68 to a primary inlet 50c of the heat exchanger 50 in which the commercial water FW undergoes heat exchange with the secondary cooling water (deionized water CW). Then, from a primary outlet 50b of the heat exchanger 50, the commercial water FW is fed back to the water supply through the piping 70.

A solenoid valve 72 is disposed in one of the pipings, for example, the piping 68. Switching of the solenoid valve 72 is controlled by a switching control signal VC supplied from CPU 38 through a driver circuit 74.

In the cooling apparatus 22, the deionized water CW from the outlet 52b of the pump 52 has a temperature of, say, about 35 degrees centigrade, and is supplied to the chamber 14 through the piping 20. Within the chamber 14, the deionized water CW passes through the waterway surrounding the YAG rod 12 and the excitation lamp 10. The temperature of the deionized water CW flowing out of the chamber 14 has risen by about few degrees centigrade, and this water is supplied through the piping 21 to the secondary inlet 50a of the heat exchanger 50 where the water is cooled to, for example, 30 degrees centigrade by undergoing heat exchange with the primary cooling commercial water FW. The deionized water CW from the secondary outlet 50b of the heat exchanger 50 is supplied to the ion exchanger 60 through the inlet 58a of the tank 56. The ion exchanger 60 deionizes the deionized water CW. The water CW flows out of the ion exchanger 80 and then passes through the filter 82 within the tank 58. The filter 58 removes unnecessary materials (e.g., organic materials) from the water CW. Then the deionized water CW is drawn by the pump 52 back to the chamber 14.

In the arrangement of the cooling apparatus 22, the heat exchanger 50, the temperature sensor 84, the temperature detecting circuit 88, CPU 38, the driver circuit 74 and the solenoid valve 72 serve as a whole as a temperature control for controlling the temperature of the deionized water CW that is supplied to the laser oscillator chamber 14.

The temperature sensor 64 detects the the temperature of the deionized water CW within the tank 58. The temperature detecting circuit 66 outputs the temperature signal St indicative of the temperature of the deionized water CW to CPU 38. CPU 38 compares the temperature signal St with a reference value Pt and selectively opens or closes the solenoid valve 72 depending on the result of the comparing.

Specifically, when the temperature signal St exceeds the reference value Pt (St>Pt), CPU 38 outputs a high-level switching control signal VC so that the solenoid valve 72, is opened. Thus, the commercial water FW flows to the heat exchanger where the commercial water FW undergoes heat exchange with the deionized water CW so that the temperature of the deionized water will be lowered.

When the temperature signal St falls down below the reference value Pt (St≦Pt), CPU 38 outputs a low-level switching signal VC so that the solenoid valve 72 is closed. Since the solenoid valve 72 is closed, no further commercial water FW is supplied to the heat exchanger 50, thus reducing the heat exchange so that the temperature of the deionized water CW will be raised.

Figure 3:
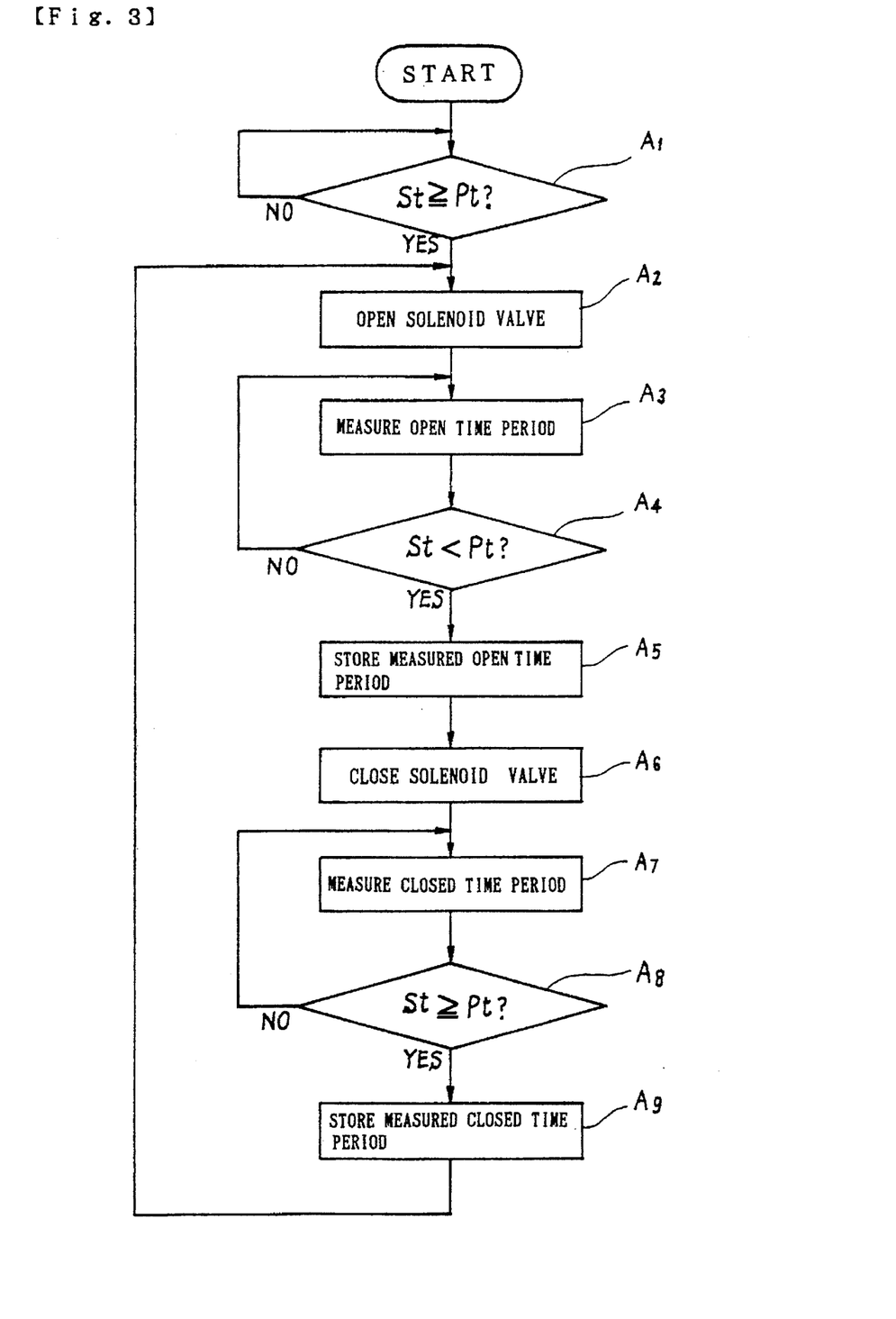
FIG. 3 is a flow chart of a process executed by CPU for temperature control in accordance with the invention.
Figure 5:
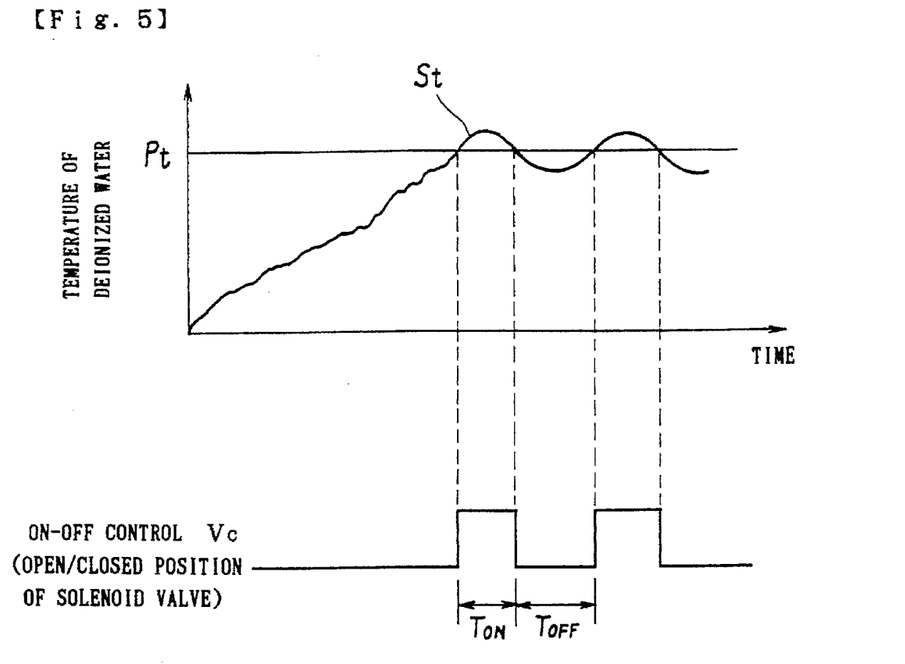
FIG. 5 is a schematic diagram showing the relation between temperature variations of deionized water (secondary cooling water) and open/close operation of a solenoid valve in accordance with the invention.

The operation of the temperature control of the invention will now be described with reference to FIGS. 3 and 5. FIG. 3 shows a process of CPU 38 for the temperature control in accordance with the invent ion. FIG. 5 schematically illustrates the relation between temperature variation of the deionized water CW and open/close operation of the solenoid valve 72 in accordance with the invention.

When the laser oscillation starts, the laser oscillator 14 (excitation lamp 10 and YAG rod 12) generates heat which warms the deionized water CW to raise the temperature St thereof. When the temperature St of the deionized water CW exceeds the reference value Pt (step A1), CPU 38 opens the solenoid valve 72 (A2) and measures the open time of the solenoid valve 72 (A3). Since the heat exchange involves a time delay, the temperature St of the deionized water CW starts decreasing at a slightly later time (e.g., two or three seconds) after the opening of the solenoid valve 72 as shown in FIG. 5.

Afterwards, when the temperature St of the deionized water CW falls down below the reference value Pt (A4), CPU 38 closes the solenoid valve 72 (A6). At the same time, CPU 38 stores the measured open time period of the solenoid valve 72 into the memory 40 (AT). Then CPU 98 measures the closed time of the solenoid valve 72. The temperature St of the deionized water CW starts increasing at a slightly later time after the closing of the solenoid valve 72.

When the temperature St of the deionized water CW exceeds the reference value Pt again (A8), CPU 38 opens the solenoid valve 72 (A2) and stores the measured closed time of the solenoid valve 72 into the memory 40 (A9).

In this manner, the temperature control of the invention successively measures and stores the open and closed time periods of the solenoid valve 72 while selectively opening or closing the solenoid valve depending on the relation between the temperature St of the deionized water CW and reference value Pt.

In accordance with the invention, the reference value Pt is not fixed but is variably controlled by a reference control function (to be described) based on duty factor of open and closed times of the solenoid valve 72. The measured and stored open and closed time periods are used to compute the duty factor.

By way of example, the duty factor of the solenoid valve 72 may be given by:

$$D=T_{ON}/(T_{ON}+T_{OFF}) \quad (1)$$

in which D indicates the duty factor. $T_{ON}$ indicates the open time of the solenoid valve and $T_{OFF}$ indicates the closed time of the solenoid valve.

In the present temperature control, the duty factor D varies depending on the temperature of the commercial water FW. Normally, the commercial water FW has a temperature lower than 25 degrees centigrade. In summer, however, the temperature of the commercial water FW can rise up to near 35 degrees centigrade. A conventional water-cooled heat exchanger provides normal heat-exchange operation or function for the temperature difference greater than 5 degrees centigrade between the secondary cooling water (before the heat exchange) and the primary cooling water (before the heat exchange).

Hence, for the commercial water of 35 degrees centigrade, the secondary cooling water before the heat exchange should have a temperature of 40 or more degrees centigrade. In this case, the laser oscillator is cooled by the secondary cooling water having a temperature of near 40 degrees centigrade. The cooling water of near 40 degrees centigrade produces, however, a sufficient cooling effect on the YAG laser oscillator since the laser oscillator generates a considerable amount of heat energy.

Therefore, the present reference control variably controls the temperature reference value Pt within the range between 30 and 40 degrees centigrade.

Figure 4:
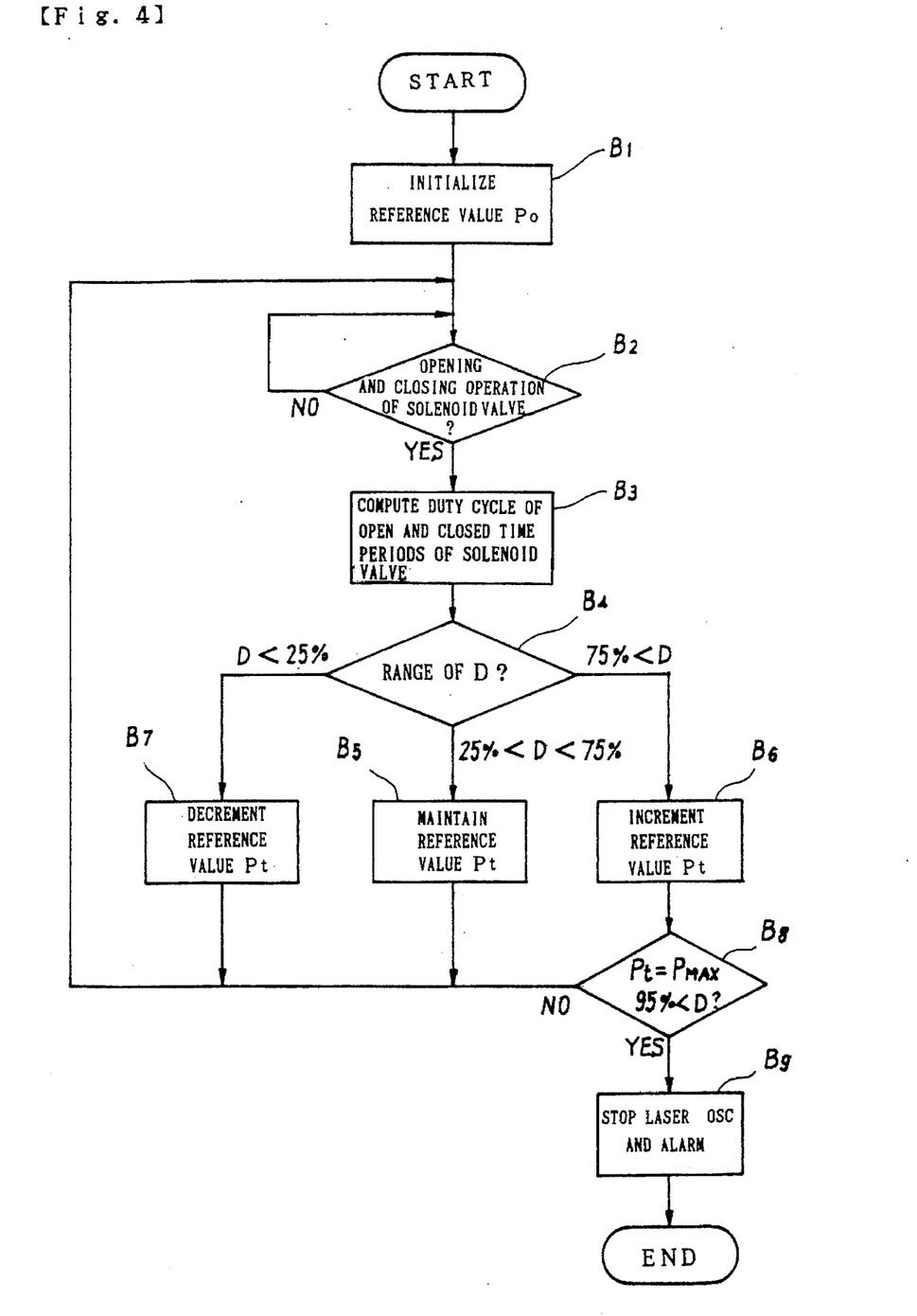
FIG. 4 is a flow chart of a process executed by CPU for variably controlling a reference value in accordance with the invention.

FIG. 4 shows a processing of CPU 38 for providing the reference control. The reference control process is performed concurrently with the temperature control process (FIG. 3).

First (step B1), CPU 38 initialize the reference value Pt to an initial value Po (e.g., 30 degrees centigrade). The reference value Pt is referenced by the temperature control process (FIG. 3) at steps A1, A4 and A8. When one cycle of opening and closing of the solenoid valve 72 has completed under the control of the temperature control process (step B2), CPU 38 computes the duty factor D of the solenoid valve 72 from the measured open and closed times $T_{ON}$, $T_{OFF}$ stored in the memory 40 according to the formula (1) stated above (B3).

Then CPU 38 determines the range of the computed duty factor D by finding, from among plurality of predetermined ranges, the one within which the computed duty factor D lies. In the present embodiment, there are three predetermined ranges of "too low" (0–25 percent), "appropriate" (25–75 percent) and "too high" (75–100 percent). If the computed duty factor D lies within the appropriate range (25 percent<D>75 percent), CPU 38 maintains the reference value Pt as is (B5). Thus, at the steps A1, A4 and A8 in the following temperature control process (FIG. 3), CPU 38 will read the same reference value Pt.

If the duty factor D is too high (D<75 percent), CPU 38 increments the reference value Pt by a predetermined value which may be either a constant (e.g., 2 degrees centigrade) or a variable. Thus the following temperature control process (FIG. 3) will read the updated (incremented) reference value Pt at steps A1, A4 and A8.

If the duty factor D is too low (D<25 percent), CPU 38 decrements the reference value Pt by a predetermined value which may be either a constant (e.g., 2 degrees centigrade) or a variable. Thus, the following temperature control process (FIG. 3) will read the updated (decremented) reference value at steps A1, A4 and A8.

The steps B2–B4 and one of B5–B7 are executed each time when one cycle of opening and closing of the solenoid value 72 has completed.

If the duty factor D has exceeded 75 percent due to the temperature rise of the commercial water FW, the reference control process (FIG. 4) increments the reference value Pt (B6). This would shorten the open time $T_{ON}$ of the solenoid valve 72 so that the duty factor D would decrease to less than 75 percent. In this manner, the reference value Pt increases as the temperature of the commercial water FW increases.

For the commercial water temperature of about 35 degrees centigrade, the reference value Pt will reach the upper limit $P_{MAX}$ (about 40 degrees centigrade). If the duty factor D has exceeded a predetermined limit (e.g., 95 percent) with the upper limit $P_{MAX}$ of the reference value (B8), this indicates the limit of the cooling capacity. Then, the reference control process (FIG.4) disconnects the laser oscillator from the electric power supply to stop the operation of the laser oscillator and controls the display 44 and/or alarm device (not shown) to provide an alarm (B9).

If the duty factor D has fallen below 25 percent due to the temperature fall of the commercial water FW, the reference control (FIG. 4) decrements the reference value Pt (B7). This would extend the open time $T_{ON}$ of the solenoid valve 72 so that the duty factor D would increase to more than 25 percent. In this manner the reference value Pt decreases as the temperature of the commercial water decreases.

Figure 6:
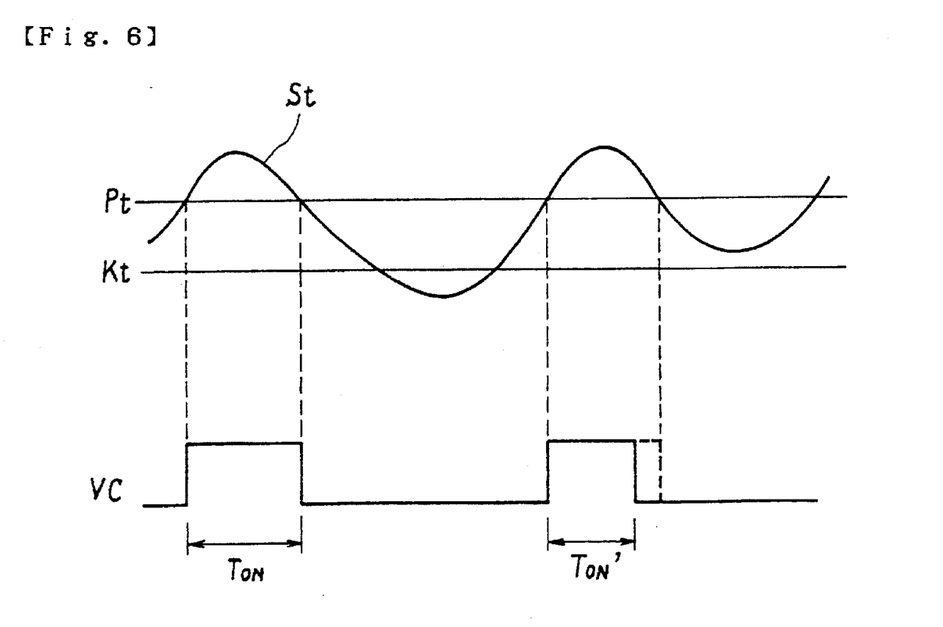
FIG. 6 is a schematic diagram showing a control method in the case of an extremely low duty factor.

Since the heat exchange process involves a time lag as noted, the temperature of the deionized water CW (secondary cooling water) starts decreasing at a slightly later time after the solenoid valve 72 is opened to supply the commercial water FW (primary cooling water) to the heat exchanger 50. If the commercial water FW is too cold for the reference value Pt, an excessive heat exchange effect (cooling effect) would be produced with the open time $T_{ON}$ of the solenoid valve 72. As a result, the temperature St of the deionized water CW would fall far below the reference value Pt as shown in FIG. 6. This would extend the closed time $T_{OFF}$ of the solenoid valve 72. resulting in decrease of the duty factor D.

In the case of the duty factor D of less than 25 percent with the lower limit $P_{MIN}$ (about 30 degrees centigrade) of the reference value Pt. a premature closing control may be provided which closes the solenoid valve 72 before the temperature of the deionized water St falls below the reference value Pt, as shown in FIG.6, by shortening the current open time to $T_{ON}$, relative to the previous open time $T_{ON}$. This would compensate for the excessive heat exchange or cooling effect and cause the duty factor D to return within the appropriate range (25 percent<D<75 percent). If desired, the compensation control may be effected when the temperature St of the deionized water CW falls below a lower monitor value Kt which is smaller than the current reference value Pt by a predetermined value or ratio.

The temperature control and the reference control cooperates with each other. In response to a temperature change of the commercial water FW, the temperature control controls the solenoid valve 72 in such a manner that the temperature change is reflected in the duty factor of the solenoid valve 72. The reference control monitors the duty factor and variably controls the reference value Pt in such a manner that the duty factor remains within a predetermined appropriate range.

Therefore, the solenoid valve VP does not remain open even in summer. In winter, the reference temperature value Pt is automatically adjusted to a relatively low temperature. Thus, the set-up time is shortened and frequent switching of the solenoid valve can be avoided.

The laser apparatus of the invention provides adaptive temperature control in response to the temperature of the commercial water FW, assuring the function of the temperature control and stable and safe operation of the laser oscillator.

The duty factor D of the solenoid valve is not limited to the one specified by the above formula (1). The duty factor D may be given by any other suitable formula, for example $T_{ON}/T_{OFF}$ or $T_{OFF}/(T_{ON}+T_{OFF})$. Whereas the embodiment determines the duty factor D of the solenoid valve 72 for each open/close cycle of the solenoid valve operation, this is not restrictive. For example, the duty factor of the solenoid valve may be determined for every other cycle, two-cycle or predetermined period of the solenoid valve operation. The criteria of the duty factor done in step B4 in the embodiment are merely illustrative. Any other suitable criteria may be employed. If desired, an electromagnetic flow control valve may be provided in the commercial water piping 68 or 70 so as to variably regulate the flow of the commercial water FW depending on the duty factor.

The arrangement of the laser electric power supply shown in FIG. 1 is merely illustrative. Also the arrangement of the laser oscillator shown in FIG. 1 is merely illustrative. The invention can apply to any laser apparatus of water-cooled type, not to mention the YAG laser beam processing apparatus.

In the laser apparatus of the invention, the temperature control selectively opens or closes the solenoid valve disposed in the primary cooling water supply piping to the heat exchanger to thereby control the temperature of the secondary cooling water to be supplied to the laser oscillator. In accordance with the invention, the reference control variably controls the reference temperature value depending on the duty factor of the open and closed times of the solenoid valve to thereby adapt the temperature control to the temperature of the primary cooling water and assure stable operation of the laser oscillation.

What is claimed is:

1. A laser apparatus including means for controlling temperature of the secondary cooling water at a desired temperature by a water-cooled heat exchanger providing heat exchange between primary and secondary cooling water, and for supplying the temperature-controlled secondary cooling water to a laser oscillator, said laser apparatus, comprising:

temperature detecting means for detecting temperature of the secondary cooling water;

a solenoid valve disposed in piping which supplies the primary cooling water to the heat exchanger;

temperature control means for comparing a signal from the temperature detecting means indicative of the temperature of the secondary cooling water with a reference value and for selectively opening or closing the solenoid valve depending on the result of the comparing;

duty factor computing means for computing duty factor of open and closed time period of the solenoid valve; and reference control means for variably controlling the reference value based on the computed duty factor.

2. The laser apparatus of claim 1 wherein the computed duty factor is given by:

$$D=T_{ON}/(T_{ON}+T_{OFF})$$

in which D indicates the computed duty factor, $T_{ON}$ indicates the open time period of the solenoid valve and $T_{OFF}$ indicates the closed time period of the solenoid valve.

3. The laser apparatus of claim 2 wherein the reference control means comprises:

incrementing means for incrementing the reference value when the computed duty factor is greater than a first predetermined value;

decrementing means for decrementing the reference value when the computed duty factor is smaller than a second predetermined value which is smaller than the first predetermined value; and maintaining means for maintaining the reference value when the computed duty factor is between the first and second predetermined values.

4. The laser apparatus of claim 1 wherein the duty factor computing means comprises:

open time period measuring means for measuring the open time period of the solenoid valve;

closed time period measuring means for measuring the closed time period of the solenoid valve; and computing means for computing the duty factor from the measured open time period and the measured closed time period.

5. The laser apparatus of claim 1 wherein the computed duty factor is given by:

$$D=T_{OFF}/(T_{ON}+T_{OFF}), \text{ or}$$

$$D=T_{ON}/T_{OFF}$$

in which D indicates the computed duty factor, $T_{ON}$ indicates the open time period of the solenoid valve and $T_{OFF}$ indicates the closed time period of the solenoid value.

* * * * *